United States Patent [19]
Geurts

[11] 3,750,759
[45] Aug. 7, 1973

[54] HITCH CONSTRUCTION
[76] Inventor: Cletus J. Geurts, 530 N. Melvin, Gibson City, Ill.
[22] Filed: Sept. 15, 1971
[21] Appl. No.: 180,559

Related U.S. Application Data
[63] Continuation-in-part of Ser. No. 666,047, Sept. 7, 1967, Pat. No. 3,642,073.

[52] U.S. Cl................. 172/285, 172/326, 172/680
[51] Int. Cl............................................ A01b 59/00
[58] Field of Search................... 172/285, 284, 283, 172/326, 327, 328, 448, 319, 327, 396, 668, 680, 605, 677, 679, 680; 280/490

[56] References Cited
UNITED STATES PATENTS
| | | | |
|---|---|---|---|
| 1,775,297 | 9/1930 | Towner | 172/680 |
| 2,950,927 | 8/1960 | Hendrickson | 172/284 X |
| 3,589,451 | 6/1971 | Wenzel | 172/285 |
| 3,061,020 | 10/1962 | Mannheim | 172/285 |

FOREIGN PATENTS OR APPLICATIONS
| | | | |
|---|---|---|---|
| 544,438 | 2/1932 | Germany | 172/680 |

*Primary Examiner*—Robert E. Pulfrey
*Assistant Examiner*—Stephen C. Pellegrino
*Attorney*—L. Paul Burd et al.

[57] ABSTRACT

A multi-bottom trailing plow is attached to the draw bar of a tractor. The hitch assembly of the plow includes a pair of vertical rods which are connected between a hitch plate fastened to the tractor draw bar and the plow frame. An expansion cylinder drives the frame relative to the hitch plate to adjust the vertical separation of the frame from the hitch plate and ground level. This arrangement also controls the depth which the plow bottoms penetrate the soil. A lever arm linkage extends from one of the vertical rods and to a tail wheel of the plow to provide for desired turning operation of the tail wheel of the plow. The hydraulic system for the expansion cylinder is controlled from the tractor. Thus, the position of the plow frame can be accurately and completely controlled to provide a level working depth by the plow bottoms.

17 Claims, 8 Drawing Figures

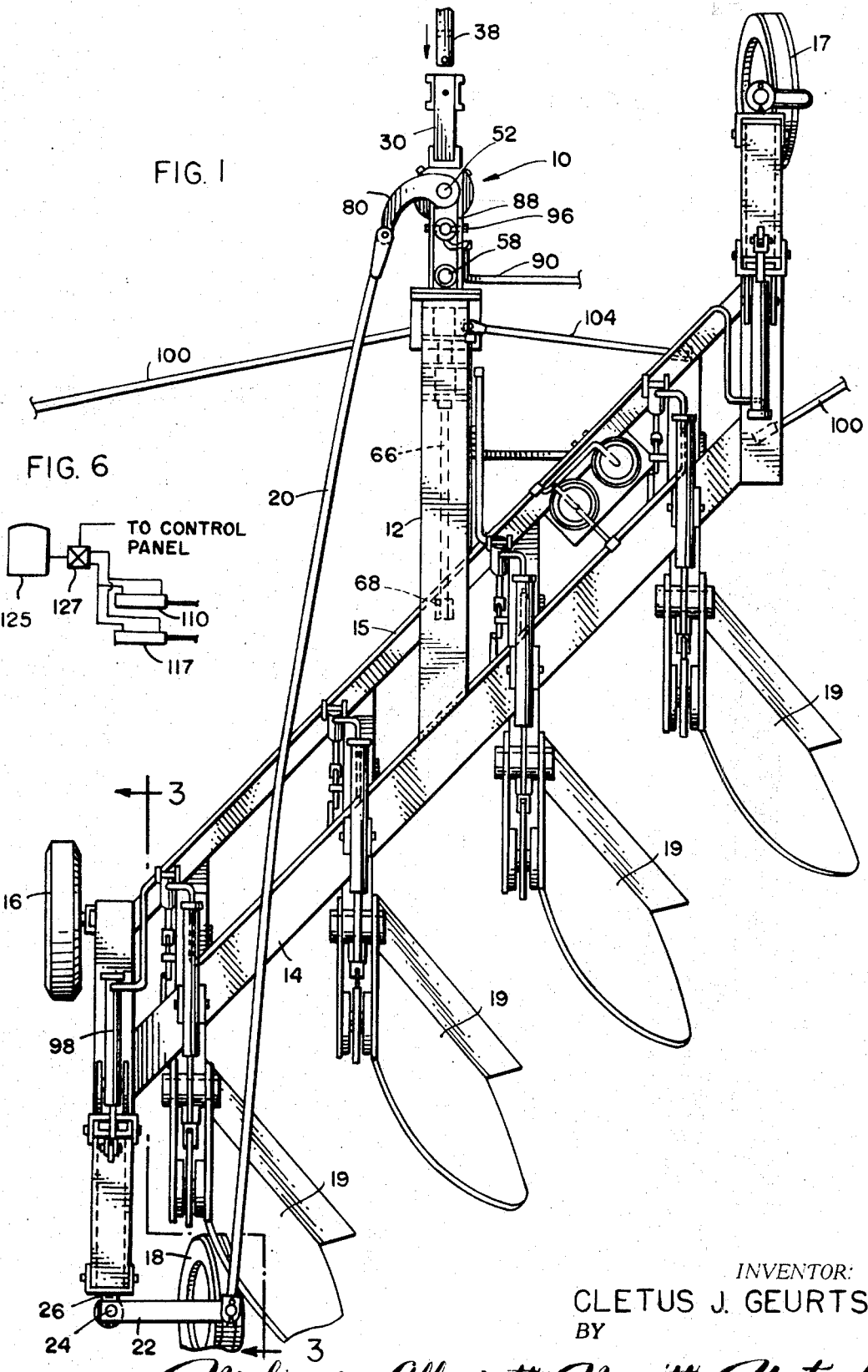

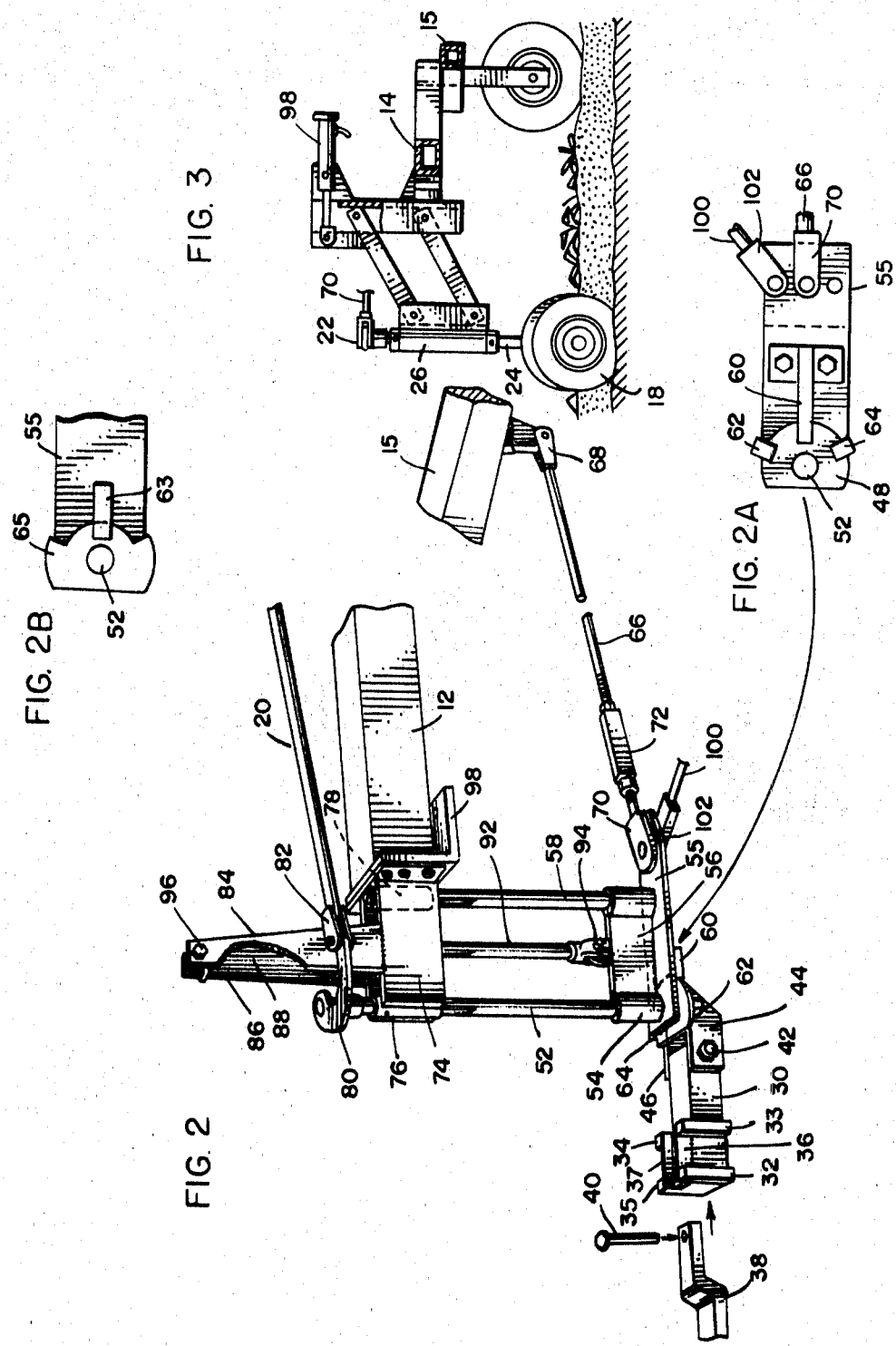

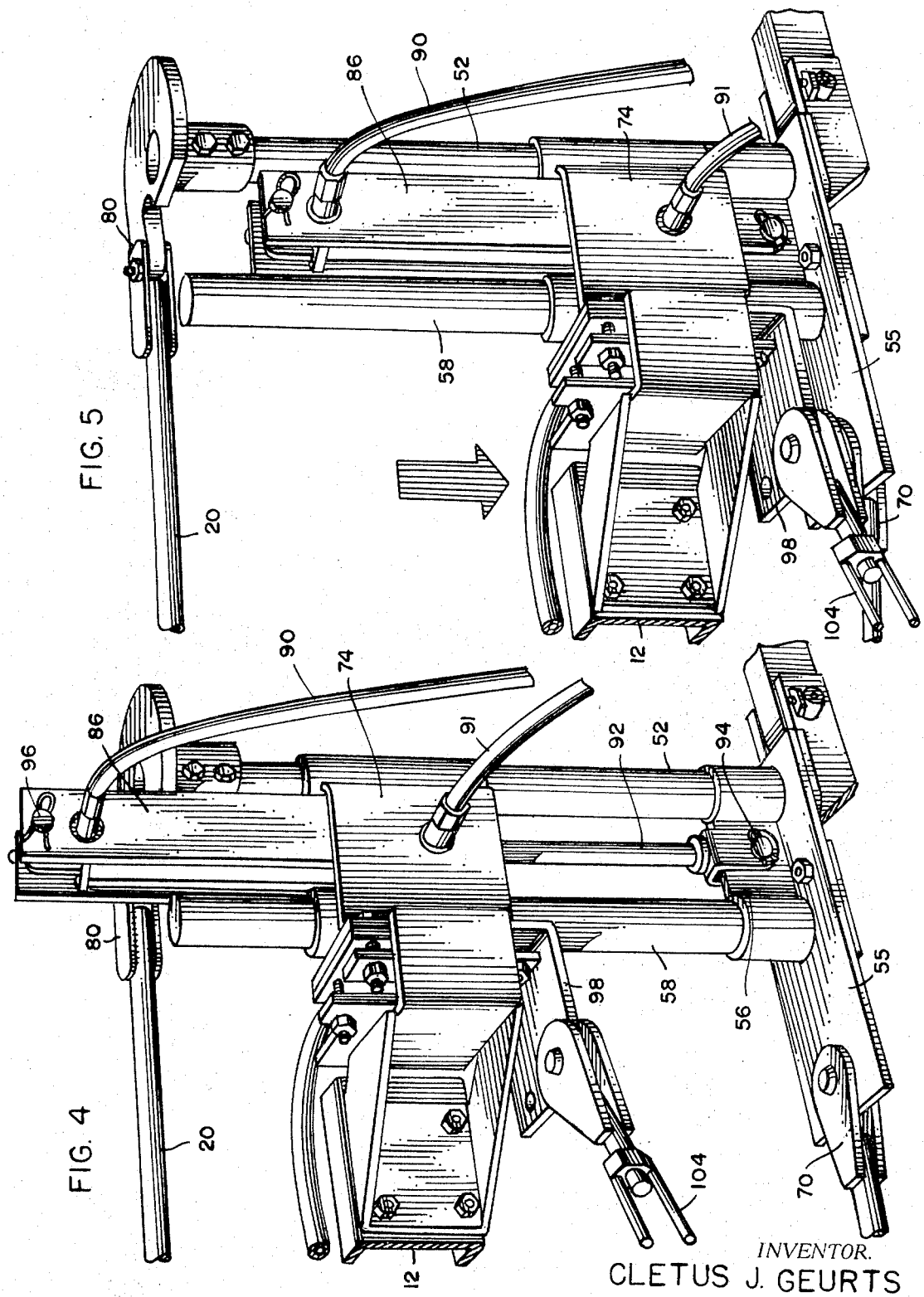

HITCH CONSTRUCTION

CROSS REFERENCE TO A RELATED APPLICATION

This is a continuation-in-part of my application Ser. No. 666,047 filed Sept. 7, 1967, now U.S. Pat. No. 3,642,073.

BACKGROUND OF THE INVENTION

This invention relates to an improved hitch construction for a farm implement and, more particularly, to a hitch construction wherein the front connecting portion of the hitch construction includes means for adjusting the elevation of the implement above ground level as well as means for controlling the working depth of the tools attached to the implement.

When preparing a field for planting in accordance with modern farming methods, a farmer generally uses a tractor to pull tools for working the soil. These tools are often incorporated as part of a farm implement which is trailed behind the tractor. To increase the utility of the tools or implement, it is customary for the farmer to have controls on the tractor for adjusting the operation of the tools or the implement. For example, a plow implement may be controlled by means for adjusting the depth of penetration into the soil of the plow bottoms of the implement.

In the past, one of the most popular means for adjusting the tools of an implement has been to provide means for adjusting the position of wheels associated with the implement. In this manner, the elevation of the tools, for example, relative to ground level could be adjusted. The present invention relates to an improved arrangement for adjusting the position of tools or an implement relative to ground level. Thus, for example, the implement of the present invention provides means for adjusting the depth of said penetration by a series of plow bottoms.

SUMMARY OF THE INVENTION

In a principal aspect, then, the present invention is the improvements in a farm implement of a hitch construction for attaching an implement to a tractor or the like. The hitch construction includes means for displacing the implement relative to ground level so that the operating position of the tools associated with the implement may be adjusted with respect to the level of the earth. Typically the depth of soil penetration by a plow may be controlled.

It is thus an object of the present invention to provide an improved hitch construction for attachment of a farm implement to means for transporting the implement and tools mounted thereon.

It is a further object of the present invention to provide an improved hitch construction wherein adjustability of the position of the implement is provided by means positioned at the attachment point of the implement to the farm tractor.

Still another object of the present invention is to provide a hitch construction which operates in combination with at least one wheel of the implement.

One further object of the present invention is to provide a hitch construction which is vertically adjustable and which is also cooperatively linked with a tail wheel of the implement for adjustment of the tail wheel to facilitate directional movement of the implement.

These and other objects, advantages and features of the present invention will be set forth in greater detail in the description which follows:

BRIEF DESCRIPTION OF THE DRAWINGS

In the detailed description which follows, reference will be made to the drawing comprised on the following Figures:

FIG. 1 is a top plan view of the improved hitch construction of the present invention as incorporated with a four-bottom plow implement;

FIG. 2 is a perspective view illustrating the improved hitch construction of the invention;

FIG. 2A is a partial bottom plan view of the hitch construction;

FIG. 2B is a partial bottom plan view of an alternative construction of the apparatus incorporating the invention;

FIG. 3 is a side elevation view of the tail wheel associated with the plow taken substantially along the line 3—3 in FIG. 1;

FIG. 4 is a perspective view of the hitch construction as viewed from the opposite side shown in FIG. 2;

FIG. 5 is another perspective view of the hitch construction wherein the hitch is in a lowered position.

FIG. 6 is a partial schematic of alternative hydraulic connections for the plow.

DESCRIPTION OF THE PREFERRED EMBODIMENT

Reference is first directed to FIG. 1 which is a top plan view of a typical four-bottom plow construction incorporatng, as an improvement, the hitch construction of the present invention. This particular plow bottom construction is otherwise described in my copending patent application Ser. No. 666,047 filed Sept. 7, 1967, now U. S. Pat. No. 3,642,073. The subject matter of Pat. No. 3,642,073 is incorporated herewith by reference to the extent that it is deemed necessary for a full and adequate disclosure of the present invention.

The subject matter of the present invention is the hitch construction, denoted generally by the numeral 10 in FIG. 1, as incorporated with a farm implement. For purposes of the following discussion, the farm implement is a plow which includes a plow frame 12, a plow beam 14, a draw beam 15, a gauge wheel 16, which is manually adjusted for desired depth, an adjustable castor wheel 17, tail wheel 18 and plow bottoms 19. Wheel 16 is in contact with the ground when plowing and assists in stabilizing the plow. Wheel 18 is known as the tail wheel or steered wheel of the plow. The hydraulic system for raising and lowering the wheels 17 and 18 is disclosed in the above referenced U.S. Pat. No. 3,642,073. Note that the description is directed to a plow by way of example only. The apparatus of the invention may be utilized in numerous other machines including harrows, listers, cultivator fertilizer equipment, chisel plows and the like.

U.S. Pat. No. 3,642,073 also discloses a steering wheel linkage including linkage bar 20, lever arm 22, steered wheel shaft 24 and a bearing assembly 26 for shaft 24. Translational movement of the bar 20 causes the arm 22 to pivot the shaft 24. Since the shaft 24 is directly connected to the wheel 18, the wheel 18 is rotated about the vertical axis of the shaft 24, causing the plow to be guided on a desired course, particularly when turning the plow. In the combination of the present invention wherein the hitch construction 10 is described in combination with a tail wheel 18, the hydraulic system associated with the tail wheel 18 causing it to be raised or lowered, as will be more fully described below, may be operated in cooperation with the hitch construction 10. This will be described in more detail below.

Referring specifically to FIGS. 2, 4 and 5, the hitch construction 10 of the present invention includes a draw bar plate or tongue 30 having bars 32 through 35 and plates 36 and 37 at its forward end to define a channel. A hitch or draw bar 38 of a tractor (not shown) is inserted into the channel formed by the bars 32 through 35 and plates 36, 37. A pin or rod 40 is fitted through an appropriate opening in the draw bar 38 and plate or tongue 30. The pin 40 locks the draw bar 38 to the tongue 30.

The rear portion of the tongue 30 is pivotally attached by means of a bolt 42 between a pair of spaced vertical plates 44 and 46. The tongue 30 may therefore pivot about a horizontal axis defined by the bolt 42. The vertical plates 44 and 46 are rigidly welded to a horizontal friction plate 48.

A first upright shaft 52 is rigidly attached to the center of plate 48 and extends upward in a substantially vertical direction. The shaft 52 defines a substantially vertical axis. Since the shaft 52 is welded to plate 48, the shaft 52 and the plate 48 rotate in unison about the defined vertical axis. The shaft 52 extends through a bearing 54, the bearing 54 being positioned in a vertical mounting plate 56 and associated horizontal plate 55. Plate 56 is welded to plate 55. Shaft 52 is translatable but is rotatable in the bearing 54. Appropriate lubricating nipples are associated with the bearing 54.

Also extending upward from the plates 55 and 56 is a second upright shaft 58. The second upright shaft 58 is substantially parallel to the first upright shaft 52. The second upright shaft is fixed to the plates 55 and 56.

Welded to the lower side of the plate 55 is a stop block 60 which can be engaged by either lug 62 or lug 64. Lugs 62 and 64 are welded to the opposite sides of the plate 48. The stop block 60 includes a portion which overlaps plate 48 and holds plate 48 against the bottom side of plate 55 as shown in FIG. 2A.

As mentioned previously, as the tongue 30 is rotated in response to movement of the draw bar 38 associated with the tractor, the bar or tie rod 20 moves to cause operation of the tail wheel 18 in a manner to facilitate proper trailing of the implement. Cooperation of lugs 62 or 64 with stop 60 prevents excessive rotation of shaft 52. Excessive rotation of shaft 52 is undesirable since it would cause bar 20 to over-drive tail wheel 18.

An alternative construction includes a notch in plate 48 which defines ears 63 and 65 that cooperate with stop 60. This alternative construction is illustrated in FIG. 2B.

A tie rod 66 connects to the draw beam 15 by means of a linkage 68. The opposite end of the tie rod 66 is connected to plate 55 by means of a second pivoting linkage 70. A turn buckle 72 permits adjustment of the length of the rod 66. Tie rod 66 increases the structural rigidity of the assembly or construction. The tie rod 66 is positioned in combination with the hitch 10 and beam 15 so that the tension on the rod 66 is substantially equal whether the hitch 10 is in a fully expanded or a fully contracted position. Tie rod 66 as illustrated in FIG. 1 is in line with the direction of plow travel. This insures maximum pull being applied to the plow in a straight line.

Also attached to plate 55 by means of a linkage 102 is a tie rod 100. Tie rod 100 connects with a tandem implement as illustrated in FIG. 1 in the event the tractor operator is operating implements in randem.

Attached to the front end of the plow frame 12 is a bracket 74. The bracket 74 includes a forward sleeve 76 for receiving the shaft 52 and a rear sleeve 78 for receiving the shaft 58. The shafts 52 and 58 are thus vertically slidable within the sleeves 76 and 78 respectively. Appropriate lubricating nipples are associated with the sleeves 76 and 78.

A first lever arm 80 is fixed to the top end of the shaft 52. Lever arm 80 is arcuately shaped to fit about the mechanism of the hitch 10 and permits turns of the implement in both directions, particularly to the left. Lever arm 80 is attached by a linkage 82 to the bar 20 and operates to position the tail wheel 18 as previously described.

Extending upward from the bracket 74 are a pair of braces 84 and 86. Positioned between the braces 84 and 86 is an expansible hydraulic cylinder 88 which is connected by suitable hydraulic lines 90 and 91 in FIGS. 1, 4 and 5 to a source of hydraulic fluid under pressure. The cylinder 88 is evident in FIG. 2 wherein brace 84 is partially cut away. Typically, the hydraulic fluid control and source will be mounted on the tractor for ease of control by the tractor operator.

A piston rod 92 associated with the hydraulic cylinder 88 is connected by linkage 94 with the plate 56. The opposite end of the hydraulic cylinder 88 is connected by means of a bolt 96 to the upper ends of the braces 84 and 86. Thus, when the hydraulic cylinder 88 is in the expanded position as illustrated in FIGS. 2 and 4, the piston rod 92 is extended causing the plow frame 12 and components attached to that plow frame 12 to be elevated with respect to the plate 55 and elements associated with the plate 55. The contracted or unexpanded position is shown in FIG. 5.

Cylinder 98 operates to move the tail wheel 18 and desplace the tail wheel 18 vertically with respect to the plow beam 14. Depending upon the desired requirements, the cylinder 88 can be operated to position the frame 12 toward the plate 55 while cylinder 98 is operated to cause the wheel 18 to be displaced vertically upward. Of course, it is also possible by changing hydraulic connections to displace the frame 12 toward the plate 55 when the wheel 18 is being vertically displaced in a downward direction. It is also possible to control the ratio of displacement of the frame 12 relative to the displacement of the wheel 18. Finally, the cylinder 88 may be connected with the same hydraulic system that operates the front castor wheel 17 to raise and lower the front end of the plow in unison. All of these various alternative mechanical interconnections and controls can be achieved by adjustment of the hydraulic connections to the cylinders 88 and 98 in a manner well known to those skilled in the art.

In the embodiment of FIG. 1, the hitch 10 is operated independently from the castor wheel 17 and tail wheel 18. In an alternatve embodiment illustrated by FIG. 6, a cylinder 110 for hitch 10 and a cylinder 117 for castor wheel 17 are operated together by the same hydraulic system. That is, pressurized fluid from a reservoir 125 is controlled by a valve 127 to thereby operate cylinders 110 and 117 in unison. In an embodiment of the type illustrated by FIG. 6, the tail wheel 18 is operated independently from the hitch 10 and castor wheel 17. In this manner, the front of the apparatus can be raided to properly control the manner in which the plows 19 will cut into the soil.

A bracket 98 in FIG. 2 associated with the frame 12 and bracket 74 includes a brace rod 104 connected between the bracket 98 and beam 15 to further strengthen the device. The brace 104 is, in fact, recommended.

The hitch construction of the present invention permits elemination of the two-point hitch normally required on multi-bottom plows. Simultaneously, the tractor operator can control the depth of the plow bottom in the soil. The compact construction eliminates the need for additional steered wheels. Steering is provided by cooperation between the hitch 10 and the tail wheel via bar 20. A shorter turning radius is another advantage.

In the foregoing description, there has been described a preferred embodiment of the invention. Alternative embodiments will be apparent to those skilled in the art. For example, the means fr positioning the hitch may be a hydraulic cylinder, as described, or it may be a mechanical worm drive with an electric motor or a hydraulic motor or it may be a mechanical chain drive. Therefore, it is to be understood that the only limitations of the subject matter of the invention shall be the claims and their equivalents.

What is claimed is:

1. In an implement having means for attachment of said implement to implement transport means and frame means including a tool mounting member, the improvement of hitch construction comprising: means for connecting said frame means to said means for attachment, said means for connecting including first means secured to the frame means, second means connected to the means for attachment, upright guide means attached to one of said first and second means, and mounted on the other of said first and second means being mounted for movement in an upright direction on the upright guide means whereby the first and second means can selectively move toward and away from each other, power means mounted on one of said first and second means and connected to the other of said first and second means for vertically displacing and positioning said first means with respect to said second means whereby the elevation of said frame means relative to the means for attachment can be adjusted.

2. The structure of claim 1 wherein: said upright guide means includes an upright guide member secured to the means for connecting, said first means and second menas being slidably mounted on said upright guide member.

3. The structure of claim 1 wherein: said power means for positioning said first means with respect to said second means includes an expansion cylinder having its opposite ends connected respectively to said first and second means.

4. The structure of claim 1 wherein: said upright guide means comprise a pair of laterally spaced guide rods secured to the second means and slideably mounted in the first means.

5. The structure of claim 4 wherein: said power means is an upright hydraulic cylinder having a portion located between the spaced guide rods.

6. In an implement of the type drawn by a vehicle and including a frame means having a mounting member for a tool and a hitch for connection to said vehicle, the improvement of: means for adjusting the elevation of said frame means with respect to said hitch comprising first means secured to the frame means, second means connected to said hitch, a first upright member attached to said second means and, at least in part, rotatable about a vertical axis as said hitch is rotated in a substantially horizontal plane, said first upright member being slidable relative to said first means in a sense along said vertical axis, and means connected to said first means and said second means for displacing said first means relative to said hitch in a sense along said vertical axis to adjust the position of said frame means relative to said hitch.

7. The structure of claim 6 including: wheel means attached to said mounting member, said wheel means including means for adjusting the vertical separation between said wheel means and said frame means.

8. The structure of claim 6 including: a guide rod substantially parallel to said first upright member and connected to said first means and said second means, said guide rod being rigidly attached to one of said first means and said second means and slidably connected with the other.

9. The structure of claim 6 wherein: said means for displacing said first means includes an expansion cylinder having its opposite ends connected respectively to said first means and said second means.

10. The structure of claim 6 including: connecting means between said second means and said frame means to provide for stability of said implement.

11. The structure of claim 6 including: wheel means attached to said frame means, said wheel means including means for adjusting the position of said wheel means relative to said frame means, means for operating said means for adjusting and said means for displacing said frame means relative to said hitch being to adjust the vertical height and position of said frame means above grade.

12. The structure of claim 6 including: wheel means attached to said frame means, said wheel means including adjustable wheel path guide means, said first vertical member including means connected with said wheel path guide means to adjust said wheel path guide means in response to rotation of said first upright member about said vertical axis.

13. The structure of claim 6 including: wheel means attached to said frame means by means including a rotatable, upright pivot member; a first lever arm attached to said upright pivot member; a second lever arm attached to said upright member, and linkage means connecting said lever arms to provide rotational movement of said wheel means to rotation of said upright member about said vertical axis.

14. The structure of claim 6 including: auxiliary interconnecting means between said second means and said frame means.

15. The structure of claim 14 wherein: said auxiliary interconnecting means include a tie rod extending in the direction of desired implement travel from said second means to said frame means.

16. The structure of claim 6 including: a second upright member attached to the second means and slideable relative to the first means along a vertical axis, said means for displacing said first means being located between the first upright member and the second upright member.

17. The structure of claim 16 wherein: the means for displacing the first means is a hydraulic cylinder.

* * * * *